R. H. RICHARDS.
APPARATUS FOR AND PROCESS OF CLASSIFYING MINERALS.
APPLICATION FILED JULY 25, 1907.

1,170,848.

Patented Feb. 8, 1916.
2 SHEETS—SHEET 1.

Witnesses:

Inventor
Robert Hallowell Richards,
By Dodge Sons
Attorneys.

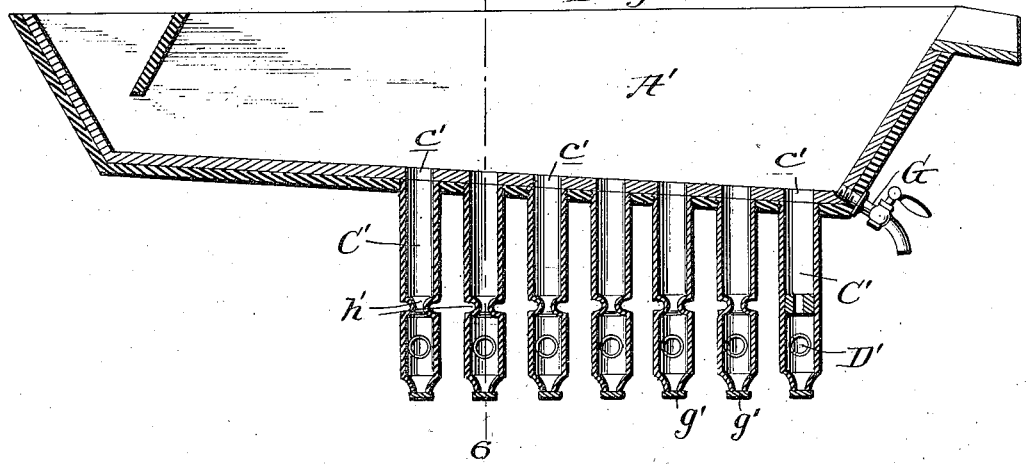
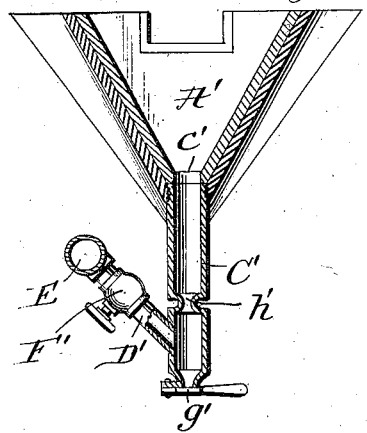
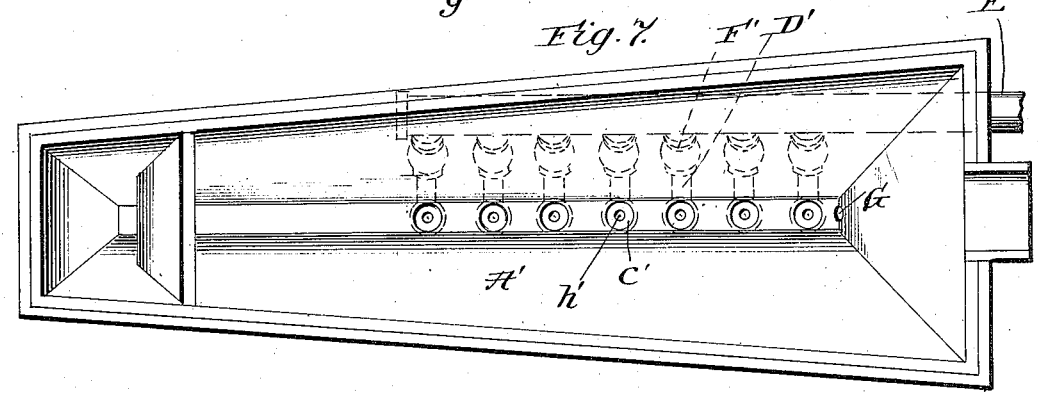

UNITED STATES PATENT OFFICE.

ROBERT H. RICHARDS, OF BOSTON, MASSACHUSETTS.

APPARATUS FOR AND PROCESS OF CLASSIFYING MINERALS.

1,170,848.      Specification of Letters Patent.      Patented Feb. 8, 1916.

Application filed July 25, 1907. Serial No. 385,503.

*To all whom it may concern:*

Be it known that I, ROBERT HALLOWELL RICHARDS, a citizen of the United States, residing at Boston, in the county of Suffolk and State of Massachusetts, have invented certain new and useful Improvements in Apparatus for and Processes of Classifying Minerals, of which the following is a specification.

My invention has reference to apparatus used in concentrating mills, for separating, grading, or classifying ores by the aid of water, and particularly to a type of apparatus which I term a hindered settling classifier.

The invention is susceptible of somewhat varied embodiment, and in the accompanying drawings I have illustrated two slightly different forms, both, however, embodying the same principles of construction and operation.

Figure 1:
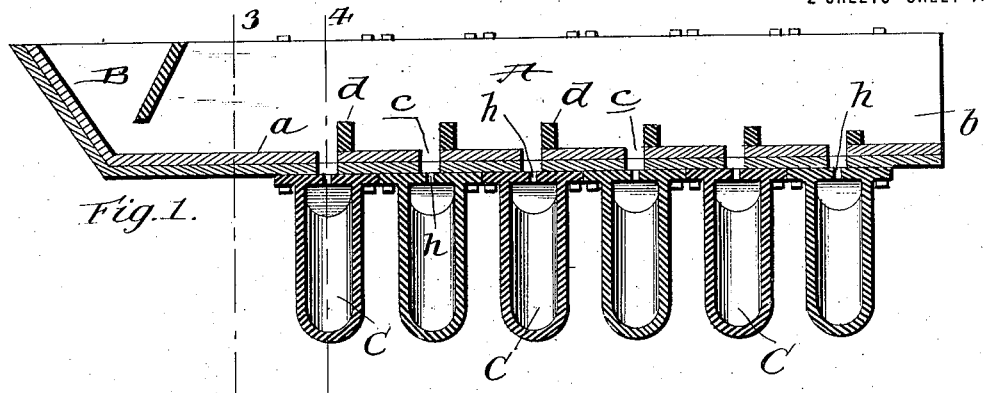
Figure 2:
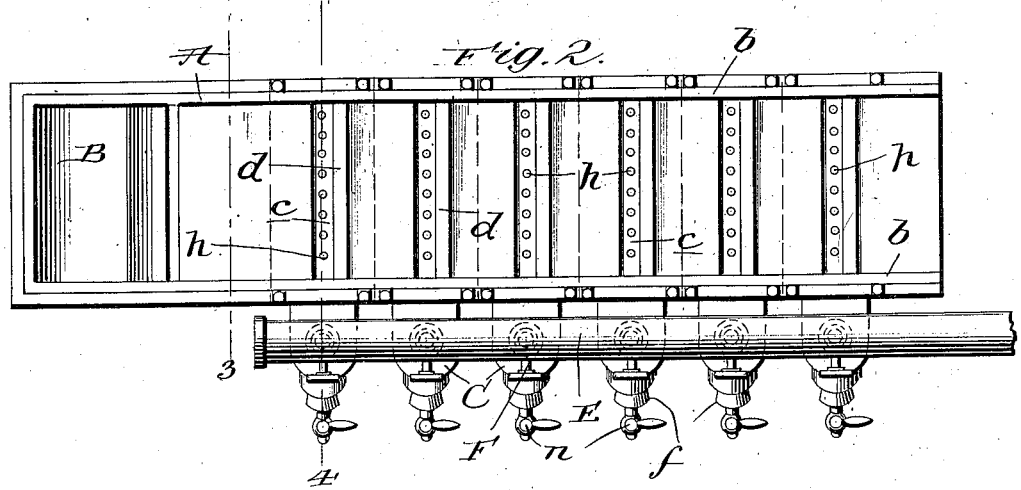
Figure 3:
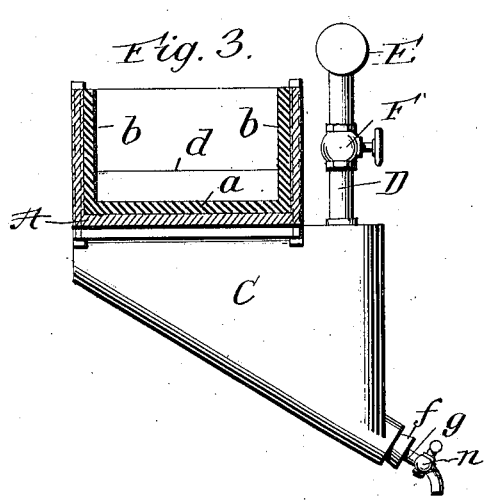
Figure 4:
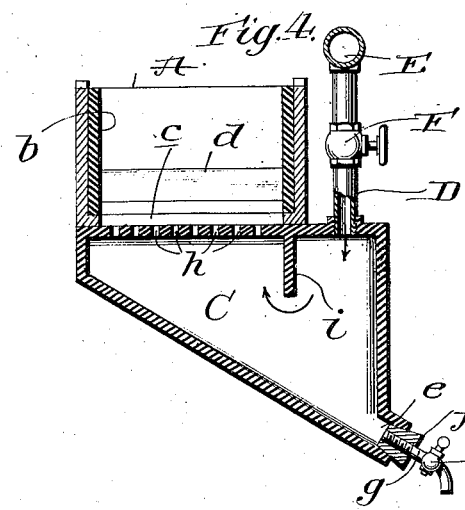

In said drawings: Figure 1 is a longitudinal sectional view of my improved apparatus, on the type that I term the perforated plate hindered settling classifier; Fig. 2, a top plan view of the same; Fig. 3, a transverse vertical section, on the line 3—3 of Figs. 1 and 2; Fig. 4, a similar section on the line 4—4 of said figures; Fig. 5, a longitudinal sectional view of my improved apparatus of the type that I term the constricted pipe hindered settling classifier; Fig. 6, a transverse sectional view of the same on the line 6—6 of Fig. 5; and Fig. 7, a top plan view of same.

In order to make clear the nature and scope of my present invention, I will first define or explain the settling act of mineral grains in water.

There are two conditions under which sands or mineral grains of mixed sizes and of different specific gravities can and will settle in water, viz.:

First. Where the grains are entirely free from one another, each assuming its natural rate and speed of settling, due to its size, weight, and shape. When, for example, mixed grains of quartz and galena are allowed to settle in water under these conditions, it is found that the grains of the lighter quartz, which settle at the same rate with the heavier galena, have a diameter of (approximately) four times that of the latter. This is called classifying under free settling conditions.

Second. If, on the other hand, water be admitted through a small aperture or series of apertures to the bottom of a vessel in which a mass of grains of quartz and galena is resting, the rise of the current of water through the mass causes the quartz and galena grains to arrange themselves according to their ability to settle under such conditions, and it is found that the grain of quartz that settles in juxtaposition with the grain of galena has (approximately) six times the diameter of the latter. This method of classification is called classification under hindered settling conditions.

Among many ways in which the hindered settling conditions may be commercially utilized, two will be here described and illustrated. The two types of apparatus I designate as the perforated plate hindered settling classifier, and the constricted pipe hindered settling classifier. These will be described in the order named, it being observed, however, that in each the pressure chamber is in communication with the pocket by a reduced thoroughfare and the principle or mode of operation is the same in both, though details of construction differ, and the exact forms here shown are not necessary, provided the principle is maintained. This mode of operation constitutes a process which is an inseparable part of the invention as embodied in the classifier of either type disclosed.

Referring to Figs. 1 to 4, inclusive, showing the perforated plate construction, A indicates a flume or trough, having at one end a feed hopper, B, and provided with a lining comprising a sole plate *a* and wall plates *b*, which lining is removable for the purpose of renewal when worn. These parts may be of wood, metal, stone, or in fact of any suitable material, iron being suitable for the lining. At suitable intervals the bottom and sole plate of the flume or trough are interrupted, or provided with vertical openings *c* forming vertical pockets, extending transversely across them, as best seen in Figs. 1 and 2. At that side of each opening *c* farthest from the feed hopper B there is a dam or raised wall *d*, the several dams being shown of progressively less height from the receiving toward the delivery end of the flume or trough A, as will be seen upon referring to Fig. 1. This, however, is not essential. Beneath the flume or trough A and bolted or otherwise made fast thereto is a series of hutches or relatively narrow chambers C, which may be cast or otherwise formed, and which are advisably made of the form shown by Figs. 1, 3 and 4. These hutches extend transversely across the under side of the flume and incline somewhat sharply downward toward one side, where each terminates in a circular spout or mouth $e$, which may be conveniently filled by a wooden plug $f$, bored to receive an iron pipe $g$, in turn supplied with a spigot $n$, or the spigot may be directly applied to the plug $f$. The inclined bottom wall of each hutch is preferably made of semi-circular cross section better to insure drainage to the outlet. Each hutch is somewhat longer than the width of the flume or trough and extends beyond one side thereof, as seen in Figs. 3 and 4, and rising from the top of such projecting portion of each, is a water pipe D, communicating with a main E, and furnished with a regulating cock or valve F, by which the supply of water can be regulated, or if need be, wholly cut off. That portion of the top wall of each hutch which stands immediately under an opening $c$ of the trough or tank A, is perforated by orifices $h$, and at a point between the pipe D and the orifices there is formed or placed a depending wall or apron $i$, seen in Fig. 4, which causes the water entering by pipe D to first descend toward the lower part of the hutch and then to rise and pass with practical uniformity to the several orifices of the series. This action is aided also by the inclination of the lower wall of the hutch. The orifices are of comparatively small diameter, so that the water rises through them in jets of greater or less intensity, tending to hinder or retard the settling of the grains carried by the mixed water and sand flowing through the flume and across the vertical pockets checked in some degree by the dams $d$. While the orifices are thus small enough to produce jets of strength sufficient to maintain the sands in a condition closely resembling that of moving quicksand, they are yet large enough to permit the heavier grains or particles to settle and pass down through the orifices, into the hutch beneath, and to gravitate therein toward the outlet. By properly adjusting the regulating valve of each branch pipe D, the action may be controlled with great nicety. These thoroughfares are also constricted in form as compared to the width of the bottom of the pocket as to both modifications illustrated, and if individual orifices are considered, they are constricted in all horizontal dimensions, for they are in fact round. The term "concentrated" as applied to the classifiers, associated with the term "constricted" as applied thereto, may be defined as,—collocated at one place or point.

It is evident that the height and relative heights of the dams, the diameter of the orifices, the intensity of the jets, the cross area and depth of hutches, and like details must be regulated or varied in accordance with the minerals treated, and their size and condition. In some cases it may be found advantageous to make the dams of increasing height toward the delivery end of the flume.

Under the construction and arrangement of parts above set forth, the water and sand or granular mineral matters are delivered into the hopper B, and flow along the flume until the first dam is reached, where the flow is in a measure checked and it is subjected to the influence of the water jets rising through the orifices $h$ and vertical pockets, the main current flowing on and over the various pockets $c$ and dams $d$ in succession, and being acted upon by the water jets at each point. The heavier particles fall through the orifices, those of greatest weight descending into the first hutch, and the other hutches receiving in succession particles or grains of progressively less weight.

The flume may be replaced by a tank, or, in other words, may have a partition across its lower or delivery end, if desired, as in Figs. 5, 6 and 7.

In Figs. 5, 6 and 7 there is shown a construction in which the pockets, perforated plates and hutches are replaced by pipes or columns with constrictions in them, the principle of operation remaining, however, the same. In these figures A′ indicates a tank, the sides of which converge toward each other in the lower part, making the flume of V-shape in cross section. The walls and sole or bottom plate will be provided with replaceable linings, as before, and at suitable intervals there are vertical openings $c'$. Directly beneath each opening $c'$ there is placed a vertical pipe or column C′, which will be made of cylindrical form, preferably. Each pipe or column is formed with a constriction $h'$ at a point somewhat below its top, which constriction may be produced by reducing or indenting the pipe, or by introducing a perforated plug, as may be found convenient, both constructions being shown in Fig. 5. The vertical openings $c'$ and the interior of the pipes or columns C′ above the constrictions form deep vertical pockets. These vertical pockets have their walls on the delivery side thereof of graded depth, those nearest the inlet hopper being deepest. This corresponds to the graded heights of dam $d$ in the first described structure, see Fig. 1. The lower end of each pipe or column is necked down or reduced in diameter in any convenient way, and is furnished with a cock, gate or spigot $g'$ of any suitable type. At a point between the constriction $h'$ and the lower end of the pipe or column $C'$, a pipe $D'$ opens into each pipe or column, as seen in Fig. 6, said pipes $D'$ in turn connecting with a water main $E'$, and being each provided with a regulating valve $F'$, all essentially the same as under the first described construction. The tank $A'$ is in this case shown closed at its lower end, with an overflow at which the water and light floating matters pass off, and with a safety spigot G, through which sands too heavy for the overflow and too light for the last regular spigot can escape. In this way the formation of a hurtful bank in the tank is prevented.

The principle or mode of operation of the two forms of apparatus is essentially the same as explained in connection with the perforated plate construction of Figs. 1 to 4 inclusive, hence need not be restated. Under both constructions it is possible to vary or regulate the action in each hutch or column by opening the discharge spigot $g$, or $g'$ to greater or less extent; but ordinarily it is preferred to effect the regulation solely by the valves F and F'. The heaviest material will be segregated in the first or deepest pocket similarly to the action in the first described structure where the heaviest material is segregated in the first pocket from which delivery is guarded by the highest dam $d$.

The number of hutches, columns or settling chambers may be increased or diminished at will to agree with the number of separations or grades of material wanted.

A cover-plate placed over any perforated plate or section of the screen, or a plug inserted in the top of any column will render the hutch or chamber below inoperative and prevent material from settling therein. In such case the water supply of each such hutch or chamber will be cut off.

As in the case of the hutches C so with the columns C', the proportions will depend somewhat upon the character of the minerals operated upon, the size and specific gravities of the particles, etc. No fixed proportions can be given, but the general proportions can be found by trial. The area of the hutch or the column must be sufficiently in excess of the constriction so that quicksand conditions will exist in the column, while at the same time the heavy grains are discharging through the constrictions. If the constrictions are too small the two acts cannot take place together; if too large then free settling will take the place of hindered settling.

Having thus described my invention, what I claim is:

1. A classifier having a pocket of substantially constant area in horizontal cross-section throughout its entire depth, and having a chamber below said pocket in communication therewith by a thoroughfare both concentrated and constricted with reference to at least one dimension of said pocket measured in a horizontal plane, whereby quicksand conditions may be maintained in said pocket and a high velocity of flow in said thoroughfare, a water inlet to said chamber, and a discharge from said chamber for heavier grains or particles previously passed through said thoroughfare.

2. A classifier having a pocket of substantially constant area in horizontal cross-section through its entire depth, and having a chamber below said pocket in communication therewith by a thoroughfare both concentrated and constricted with reference to one dimension only of said pocket measured in a horizontal plane, whereby quicksand conditions may be maintained in said pocket and a high velocity of flow in said thoroughfare, a water inlet to said chamber, and a discharge from said chamber for heavier grains or particles previously passed through said thoroughfare.

3. A classifier having a pocket of substantially constant area in horizontal cross-section throughout its entire depth, and having a chamber below said pocket, a plane perforated plate forming the bottom of said pocket and the top of said chamber, the perforation of said plate forming a thoroughfare both concentrated and constricted with reference to at least one dimension of said pocket measured in a horizontal plane, whereby quicksand conditions may be maintained in said pocket and a high velocity of flow in said thoroughfare, a water inlet to said chamber, and a discharge from said chamber for heavier grains or particles previously passed through said thoroughfare.

4. A classifier having a pocket of substantially constant area in horizontal cross-section throughout its entire depth, and having a chamber below said pocket, a plane perforated plate forming the bottom of said pocket and the top of said chamber, the perforation of said plate forming a thoroughfare both concentrated and constricted with reference to one dimension only of said pocket measured in a horizontal plane, whereby quicksand conditions may be maintained in said pocket and a high velocity of flow in said thoroughfare, a water inlet to said chamber, and a discharge from said chamber for heavier grains or particles previously passed through said thoroughfare.

5. A flume, a series of pockets in the bottom of said flume and opening directly therein, said pockets being of substantially constant area in horizontal cross section throughout their entire depth, a series of chambers in communication with said pockets by orifices passing fluid upwardly therethrough and concentrates downwardly therethrough, said pockets adjacent said orifices being free from obstruction, and means for delivering concentrates from said chambers, the walls of said pockets on their delivery sides forming dams and being of decreasing height in regular order from first to last proceeding in the direction of flow in said flume.

6. A flume, a pocket in the bottom of said flume said pocket being short or narrow longitudinally of said flume and being of substantially constant area in horizontal cross section throughout its entire depth, and a chamber in communication with said pocket by a single thoroughfare in the length longitudinally of the flume.

7. A classifier having a pocket of substantially constant area in horizontal cross-section throughout its entire depth, said pocket having a wall prolonged to form a dam, means for passing across said pocket material to be classified, and said classifier having a chamber in communication with said pocket by a thoroughfare passing fluid upwardly therethrough and heavier grains or particles downwardly therethrough, and means for delivering fluid to said chamber and heavier grains or particles therefrom.

8. A classifier having a pocket and a chamber, a plane plate or diaphragm between said pocket and said chamber, said plate having a single thoroughfare therethrough constricted in all horizontal dimensions of said pocket, said thoroughfare being of size large enough to pass the heaviest grains or particles admitted above same, and means for delivering fluid to said chamber and said grains or particles therefrom.

9. A classifier having a pocket with a flat bottom, and having a chamber below said pocket, an orifice constricted in all horizontal dimensions, forming a thoroughfare from said chamber through the bottom of said pocket, said orifice being of size small enough to produce jets of sufficient strength to maintain quick-sand conditions in said pocket and being of size large enough to pass the heaviest grains or particles admitted to said pocket, and means for delivering fluid to said chamber and said grains or particles therefrom, whereby a separation from the raw product results of grains of differing specific gravity differing greatly in size.

10. A classifier having a pocket and a chamber, a plane plate or diaphragm between said pocket and said chamber, said plate having a single thoroughfare therethrough constricted in all horizontal dimensions of said pocket, said thoroughfare being of a size bearing the same ratio to the diameter of the largest particles of heavier specific gravity admitted to said pocket, that the diameter of those of lighter specific gravity having the same settling characteristics bears to said first-mentioned diameter, and means for delivering fluid to said chamber and said grains or particles therefrom.

11. The process of classifying materials differing substantially in specific gravity, consisting in immersing said materials in a column of liquid of substantially uniform upward slow current flow, subjecting said immersed materials to the direct action of an upwardly directed constricted jet of said liquid of quick current flow at the bottom of said column, proportioning the velocities of said liquid so as to maintain quicksand conditions in said column, and collecting the heavier particles gravitating through said jet both of higher and lower specific gravity but differing materially in size.

In testimony whereof I have signed my name to this specification in the presence of two subscribing witnesses.

ROBERT H. RICHARDS.

Witnesses:
WALTER HUMPHREYS,
J. M. COMSTOCK.